United States Patent [19]

Midland

[11] 4,368,485

[45] Jan. 11, 1983

[54] BILLBOARD LARGE SCREEN TV

[75] Inventor: Richard W. Midland, Inverness, Ill.

[73] Assignee: Zenith Radio Corporation, Glenview, Ill.

[21] Appl. No.: 253,425

[22] Filed: Apr. 13, 1981

[51] Int. Cl.³ .......................... H04N 9/22; H04N 5/68; G09G 1/16; G09G 1/28

[52] U.S. Cl. .......................................... 358/64; 358/66; 358/240; 358/242; 340/701; 340/720; 340/766

[58] Field of Search ................................ 358/64–66, 358/242, 240, 67–70; 315/9; 340/701, 720, 752, 766; 340/703, 767

[56] References Cited

U.S. PATENT DOCUMENTS 3,909,525  9/1975  Fagan ...................................... 358/87
4,247,869  1/1981  Cutler et al. .......................... 358/67

*Primary Examiner*—John C. Martin
*Attorney, Agent, or Firm*—Jack Kail

[57] ABSTRACT

A billboard video display system comprises a plurality of cathode ray tubes arranged in a predetermined configuration, each of the cathode ray tubes including a viewing screen characterized by a coarse color phosphor pattern. The electron beam generated by each of the cathode ray tubes is scanned across its respective viewing screen and modulated for developing a plurality of color picture elements. The picture elements so produced combine to form a selected billboard video display picture with the picture elements associated with each respective tube representing an unrecognizably small portion thereof.

13 Claims, 3 Drawing Figures

U.S. Patent   Jan. 11, 1983   Sheet 1 of 2   4,368,485

BILLBOARD LARGE SCREEN TV

BACKGROUND OF THE INVENTION

The present invention relates generally to billboard video display systems and, more particularly, to a billboard video display system using cathode ray tubes to form the picture elements of the video presentation.

Billboard video display systems are frequently utilized in sporting arenas to provide a large video presentation for viewing by the attending patrons and may also be used on road signs, in shopping centers and the like to display selected video information. For example, systems of this type used in sporting arenas typically provide a video display system screen measuring about 20 by 30 feet, the screen being operated in response to monitor cameras and video tape recorders for displaying instant replays of the sporting event, close-ups of key players and information on other sporting events as well as various news items and commercial messages.

In the past, monochrome video billboard display system screens have been provided by forming an X-Y matrix of incandescent light bulbs, typically 40 watt bulbs, each bulb being individually controllable and representing a single pixel (picture element) of the composite video image formed on the screen. In such a system, each of the pixels of incandescent bulbs is updated at a rate of approximately 50-60 Hz in order to provide a dynamic video image with a minimum amount of flicker. Attempts have been made to upgrade these systems for providing color billboard video displays by using colored bulbs but these attempts have been largely unsatisfactory due to the inefficiency of the color bulbs. In order to overcome this problem, video display system screens have been provided which comprise an arrangement of a plurality of small, usually about one inch in diameter, cathode ray tubes, the screen of each of the cathode ray tubes being flooded by a diverging electron beam for displaying a single color, normally red, green or blue. While the use of such cathode ray tubes is relatively costly, they are considerably more efficient than incandescent bulbs and therefore provide an acceptable color video display. The flood-operated cathode ray tubes are commonly arranged in groups of four to provide a single color pixel. That is, for example, a single color pixel may be formed by arranging four of the tubes in a square matrix with two green tubes being disposed at the opposite corners of one diagonal of the matrix and a red and a blue tube being disposed at the opposite corners of the other diagonal of the matrix. Therefore, the color pixel matrix may be selectively operated for providing a green picture element by flooding the green tubes, a red picture element by flooding the red tube or a blue picture element by flooding the blue tube. Of course, a composite billboard video display picture can be produced by selectively operating a plurality of such color pixel matrices. While a system of this general type provides an adequate billboard color video display picture, the complexity associated with the wiring and mounting hardware needed to accommodate the large number of tubes that are required detracts from the desirability of the system. In addition, in order to achieve adequate resolution, the tubes must be arranged in a relatively tightly packed configuration further increasing the complexity of the system.

It is therefore a basic object of the present invention to provide an improved billboard video color display system.

It is a further object of the invention to provide an improved billboard video color display system wherein the system screen is composed of a plurality of cathode ray tubes each being adapted for providing more than one color picture element.

It is another object of the invention to provide an improved billboard video color display system wherein the system screen is composed of a plurality of cathode ray tubes each of which is scanned by an electron beam for providing more than one color picture element.

It is yet another object of the invention to provide an improved billboard video color display system using a relatively non-complex mounting hardware and wiring system and an electronics package to drive each of a plurality of cathode ray tubes in a scanned mode for providing more than one color picture element.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

DESCRIPTION OF THE PREFERRED EMBODIMENT

Figure 1:
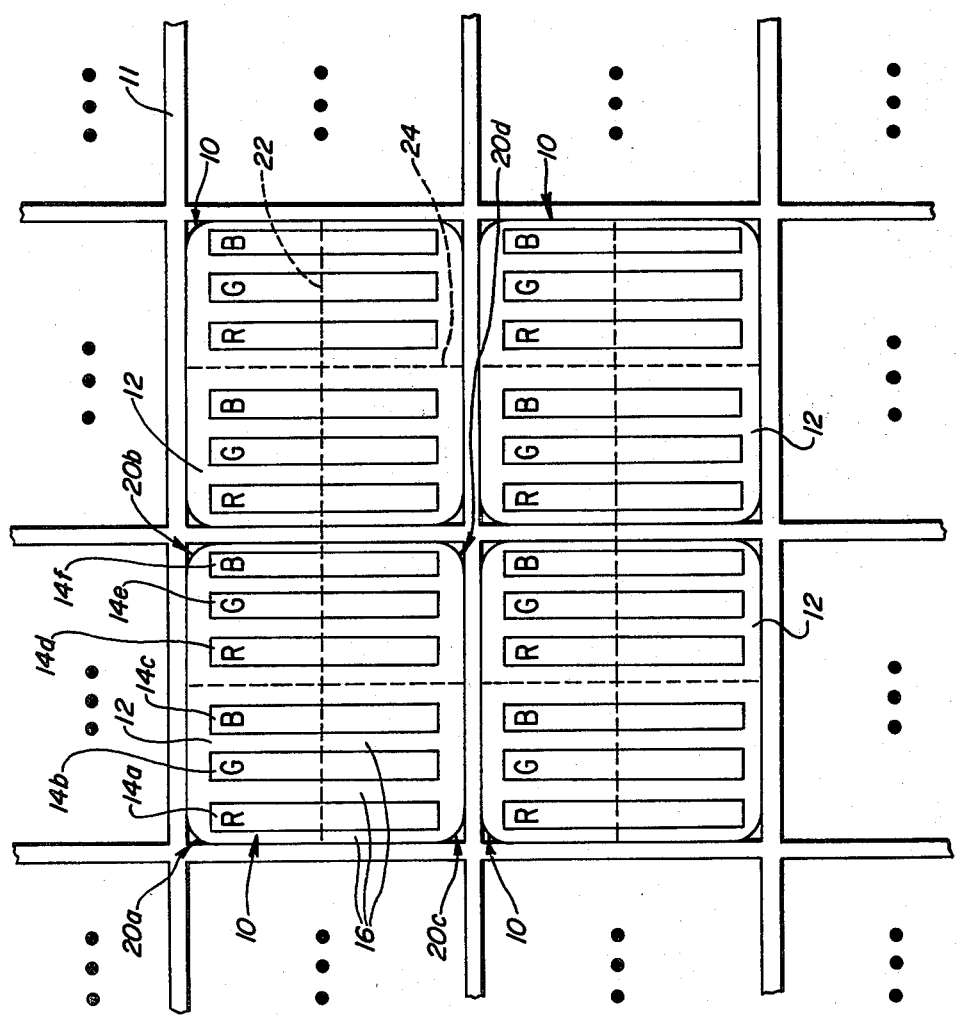
FIG. 1 shows the viewing screens of a plurality of cathode ray tubes constructed according to one embodiment of the invention which are arranged for compositely forming the system screen of a billboard video display system according to the present invention.

Referring now to the drawings and, in particular, to FIG. 1, there is shown a plurality of cathode ray tubes 10 supported by a honeycomb frame 11 such that the viewing screens 12 of the cathode ray tubes are arranged in an X-Y matrix for compositely forming the system screen of a billboard video color display system. Typically, between six to seven thousand tubes 10 are provided to form the system screen, the viewing screen 12 of each tube measuring about 4 inches by 4 inches. The viewing screens 12 of the tubes 10 are spaced from each other by frame 11 by up to about 0.20 inches.

The viewing screen 12 of each of the tubes 10 comprises a coarse phosphor pattern consisting of six relatively wide vertical color phosphor stripes 14a-14f separated from each other by a plurality of relatively wide vertical black stripes 16. In the case of the four by four inch viewing screen described above, each color phosphor stripe is approximately 7/16 inches wide with each black stripe being about 7/32 inches wide except for the black stripe between color stripes 14c and 14d which is about 7/16 inches wide. The first phosphor stripe 14a is characterized by the primary color red, the second phosphor stripe 14b by the primary color green and the third phosphor stripe 14c by the primary color blue, with the identical color pattern being repeated for the final three phosphor stripes 14d-14f. Viewing screen 12 therefore includes two identical trios of phosphor stripes, i.e. stripes 14a–14c and stripes 14d–14f, the black stripe 16 separating the two trios being slightly wider than the other black stripes 16. As will be explained in further detail hereinafter, each of the cathode ray tubes 10 includes a cathode generating an electron beam which is scanned across the associated viewing screen 12 and which is suitably modulated for activating suitable ones of the color phosphor stripes 14a–14f. In particular, each of the electron beams is modulated in a manner such that four color picture elements are provided by each viewing screen 12, the composite effect of all of these groups of picture elements being that of producing a desired billboard color display picture with each group of four color picture elements alone representing an unrecognizably small portion thereof. More specifically, the viewing screen 12 of each cathode ray tube 10 may be thought of as being divided into four quadrants 20a–20d as represented by the intersecting dotted lines 22 and 24, each quadrant 20a–20d forming a single color picture element. As the electron beam associated with each of the cathode ray tubes 10 is scanned across its viewing screen 12 it individually controls the color characterizing each picture element or quadrant 20a–20d. Therefore, for example, if it is desired that quadrant 20a of any one of the viewing screens 12 assume a red color, the electron beam of the associated cathode ray tube 10 is turned on as it is scanned through quadrant 20a for activating only red phosphor stripe 14a. As a result, when viewed from a distance, quadrant 20a of the selected viewing screen 12 will appear red. In a similar manner, quadrant 20a may be caused to assume a green or blue color or any combination of red, blue and green by turning on the associated electron beam as it is scanned through the quadrant for activating selected combinations of the red, green or blue phosphor stripes. Picture elements or quadrants 20b–20d of each viewing screen may, of course, be similarly controlled whereby each of the viewing screens is capable of displaying four individual color picture elements, the composite effect of all of the viewing screens being that of displaying a desired billboard color picture.

Figure 2:
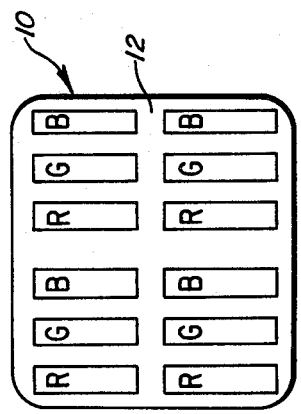
FIG. 2 illustrates another embodiment of the CRT viewing screens shown in FIG. 1.

Various modifications of the coarse phosphor pattern applied to each viewing screen 12 may be made in accordance with the invention, one such modification being illustrated in FIG. 2. In this modification, each of the phosphor stripes 14a–14f is divided into identical upper and lower portions with a relatively wide horizontal black stripe interposed therebetween. It will be appreciated that this arrangement provides a greater amount of separation between the quadrants 20a–20d than the phosphor pattern of FIG. 1.

Figure 3:
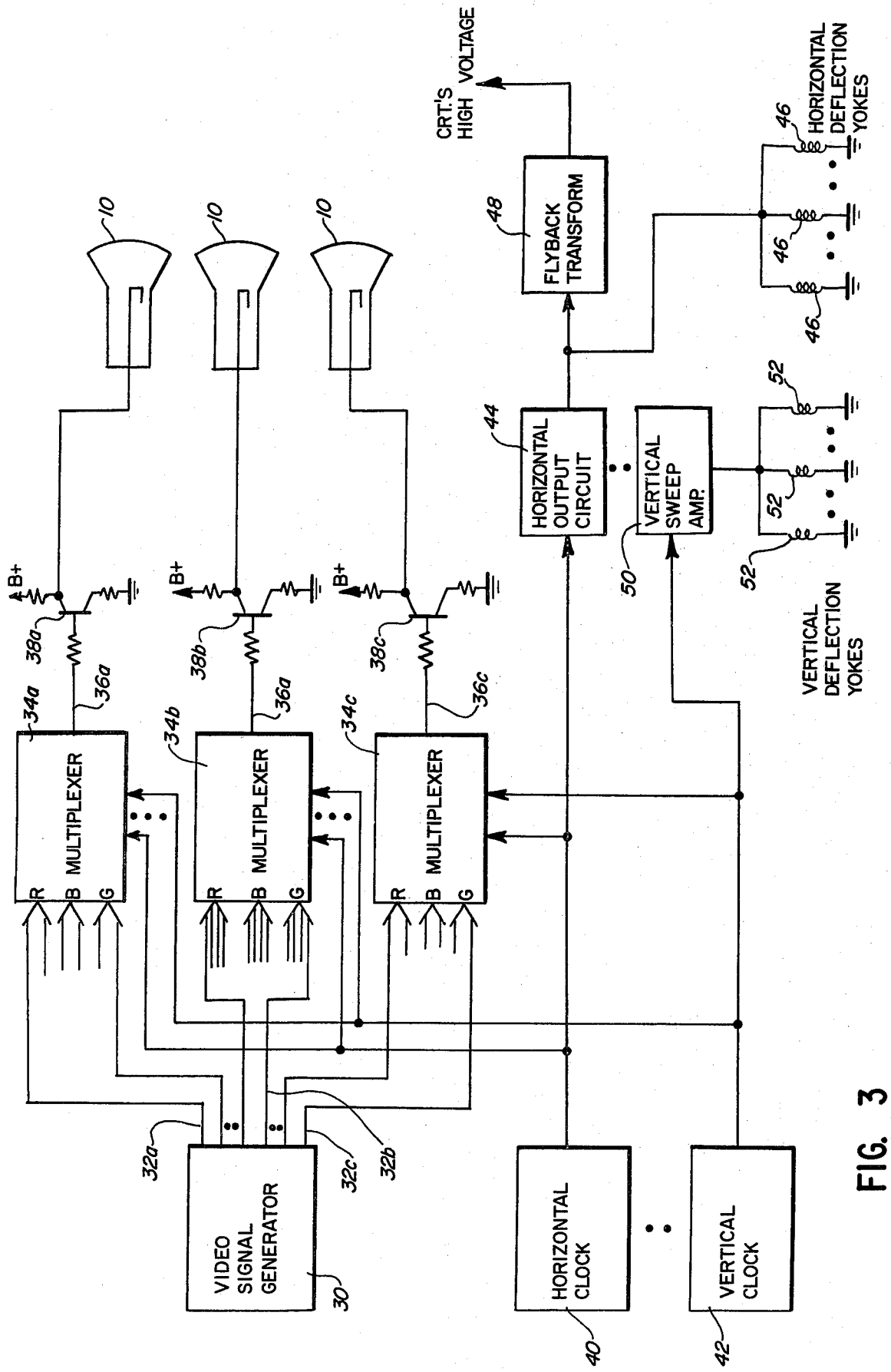
FIG. 3 is a block diagram illustrating a circuit adapted for operating the cathode ray tubes of FIG. 1.

FIG. 3 illustrates a circuit adapted for controlling the operation of the cathode ray tubes 10 of FIG. 1. In order to minimize system complexity, this circuit employs unsynchronized or free-running vertical and horizontal deflection systems which are accommodated due to the coarse phosphor patterns characterizing the viewing screens 12 of the cathode ray tubes 10. Moreover, system complexity is further reduced by driving the deflection yokes of a plurality of the cathode ray tubes 10 from a common source.

Referring in detail now to FIG. 3, a video signal generator 30 includes a plurality of multiconductor output buses 32a, 32b and 32c, each bus 32a–32c comprising twelve conductors on which are developed appropriate signals for controlling the four picture elements of a respective one of the cathode ray tubes 10. Only three buses 32a–32c are shown in FIG. 3 for simplicity, it being recognized however, that in general, one such bus is supplied for each cathode ray tube 10 of the system. The twelve conductors of each of the buses 32a–32c are coupled to twelve inputs of a respective multiplexer 34a–34c with the output conductor 36a–36c of each of the multiplexers being coupled through a respective level translating transistor 38a–38c to the cathode of one of the cathode ray tubes 10. Each of the multiplexers 34a–34c also receives switching control inputs from a free-running horizontal clock 40 and from a free-running vertical clock 42. Horizontal clock 40, which operates at a frequency equal to the reciprocal of the horizontal sweep time of one of the cathode ray tubes 10, also supplies a horizontal output circuit 44 which, in turn, drives the horizontal deflection yokes 46 of a number, three for example, of the cathode ray tubes 10. In addition, the horizontal output circuit 44 supplies a flyback transformer 48 which supplies the high voltage signals required by the three commonly operated cathode ray tubes. Vertical clock 42, which operates at a frequency equal to the reciprocal of the vertical sweep time of one of the cathode ray tubes 10, also supplies a vertical sweep amplifier 50 which, in turn, drives the vertical deflection yokes 52 of the same three cathode ray tubes whose horizontal deflection yokes 46 are driven by horizontal output circuit 44. It will be appreciated, of course, that a circuit identical to that illustrated in FIG. 3 will be required for each group of three cathode ray tubes of the billboard display system, only one such group of three cathode ray tubes together with its accompanying circuitry being shown for convenience.

In accordance with the foregoing, the electron beam produced by the cathode of each of the cathode ray tubes 10 will trace a raster across its viewing screen 12 in response to the deflection signals produced by its associated horizontal and vertical deflection yokes 46 and 52. Thus, a raster is produced on each viewing screen 12 consisting of a plurality of frames of horizontal scanning lines. As the electron beam of each cathode ray tube 10 is scanned across its associated viewing screen 12, the intensity of the beam is modulated in accordance with the signal coupled to its cathode, the cathode modulating signals being derived from the output conductors 36a–36c of multiplexers 34a–34c and preferably updated at a rate of at least 60 Hz to avoid flicker. Each of the twelve conductors coupled to the inputs of multiplexers 34a–34c consist of three groups of four conductors each, a first group being coupled to a multiplexer input labeled R (for red), a second group to a multiplexer input labeled G (for green) and the final group to a multiplexer input labeled B (for blue). The first or top conductor of each red group is supplied with a signal from video generator 30 for selectively activating the red phosphor stripe 14a in color picture element or quadrant 20a of the viewing screen 12 of the associated cathode ray tube 10, the second conductor of each red group being supplied with a signal from video generator 30 for selectively activating the red phosphor stripe 14d in color picture element or quadrant 20b, the third conductor in each red group being supplied with a signal from video generator 30 for selectively activating the red phosphor stripe 14a in color picture element or quadrant 20c and, finally, the fourth and last conductor in each red group being supplied with a signal from video generator 30 for selectively activating the red phosphor stripe 14d in color picture element or quadrant 20d. In a similar manner, the four conductors comprising each green group are supplied with signals from video generator 30 for selectively activating the green phosphor stripes 14b and 14c in the four picture elements or quadrants 20a-20d while the four conductors comprising each blue group are supplied with signals from video generator 30 for selectively activating the blue phosphor stripes 14c and 14f in the four picture elements or quadrants 20a-20d.

As mentioned previously, switching control signals for operating multiplexers 34a-34c are derived from the horizontal and vertical clocks 40 and 42. More specifically, the state of each of the multiplexers 34a-34c is determined by the position of the electron beam of the associated cathode ray tube 10 as reflected by the values of the horizontal and vertical clock signals supplied by clocks 40 and 42. Thus, during the portion of each horizontal scanning line defined by quadrant 20a the first or top conductor of each of the red, green and blue conductor groups is coupled to the multiplexer output as the electron beam is scanned over the corresponding color phosphor stripe 14a-14c. During the portion of each horizontal scanning line defined by quadrant 20b the second conductor of each of the red, green and blue conductor groups is coupled to the multiplexer output as the electron beam is scanned over the corresponding color phosphor stripe 14d-14f. Next, during the portion of each horizontal scanning line defined by quadrant 20c the third conductor of each of the red, green and blue conductor groups is coupled to the multiplexer output as the electron beam is scanned over the corresponding color phosphor stripe 14a-14c. Finally, during the portion of each horizontal scanning line defined by quadrant 20d the fourth or bottom conductor of each of the red, green and blue conductor groups is coupled to the multiplexer output as the electron beam is scanned over the corresponding color phosphor stripe 14d-14f. Thus, as a consequence, the first or top conductors of the three groups collectively control quadrant 20a, the second conductors control quadrant 20b, the third conductors control quadrant 20c and, finally, the fourth or bottom conductors control quadrant 20d.

For purposes of illustration, assume that it is desired to render both quadrants 20a and 20b of the viewing screen 12 of one of the cathode ray tubes 10 red and quadrants 20c and 20d of the viewing screen green and blue respectively. As the electron beam of the cathode ray tube begins a first horizontal sweep across the top of the viewing screen 12, the first conductor of the red group is coupled to the output of the associated multiplexer as it passes over phosphor stripe 14a. Since it is desired to render quadrant 20a red, the signal on this conductor is logically high such that the intensity of the electron beam of the cathode ray tube is modulated for activating red phosphor stripe 14a. As the electron beam continues the horizontal sweep, the first conductors of the green and blue groups are coupled in turn to the multiplexer output as the beam passes over the green and blue phosphor stripes 14b and 14c respectively. Since the signals on these latter two conductors are logically low, the green and blue phosphor stripes 14b and 14c are not activated. The foregoing is identically repeated during the portion of each subsequent horizontal scanning line defined by quadrant 20a so that the top half of only red phosphor stripe 14a is activated in quadrant 20a causing the quadrant, when viewed from a distance to assume a red color. In a similar manner, only the top half of red phosphor stripe 14d is activated in quadrant 20b in response to signals developed on the second conductors of the red, green and blue groups causing this quadrant to also assume a red color. With regard to quadrant 20c, the signals developed on the third conductors of each of the conductor groups cause only the bottom half of green phosphor stripes 14b to be activated thereby causing the quadrant to assume a green color. Finally, only the bottom half of blue phosphor stripe 14f is activated in quadrant 20d causing it to assume a blue color.

As discussed above, the four individually controllable picture elements or quadrants of each cathode ray tube 10 are alone incapable of providing any recognizable picture information. However, when a large number of such tubes are arranged in a matrix as schematically illustrated in FIG. 1, the individually controllable picture elements combine to produce a composite billboard video color display picture. It will be recalled that, in order to minimize system complexity, the horizontal and vertical deflection signals as well as the switching states of multiplexers 34a-34c are not, although they may be, synchronized with the video signals developed on buses 32a-32c by video signal generator 30. This feature is made possible by the relatively coarse phosphor pattern, including the relatively wide black stripes interposed between the color phosphor stripes, deposited on the viewing screens 12. Because of this coarse phosphor pattern, wherein each wide color phosphor stripe is surrounded or guarded by a pair of relatively wide black stripes, precise system timing is not considered necessary in order to insure that the color stripes are activated as desired.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A billboard video display system for producing a selected billboard display picture consisting of a plurality of picture elements, said system comprising:
   a plurality of cathode ray tubes arranged in a predetermined configuration, the viewing screens of said cathode ray tubes compositely forming a billboard system display screen;
   deflection means for causing an electron beam generated by each of said cathode ray tubes to scan its associated viewing screen; and
   means for generating and coupling a control signal for independently modulating said electron beam of each of said cathode ray tubes for producing a low-valued plurality of said picture elements on the screen of each of said cathode ray tubes, the picture elements produced by said plurality of cathode ray tubes combining to form said selected billboard display picture on said billboard system display screen with the picture elements associated with each of said cathode ray tubes representing an unrecognizably small portion of said billboard display picture.

2. A billboard video display system for producing a selected billboard display picture consisting of a plurality of picture elements, said system comprising:
   a plurality of cathode ray tubes arranged in a predetermined configuration, the viewing screens of said cathode ray tubes being coated with a relatively coarse color phosphor pattern and compositely forming a billboard system display screen;

free running means for generating horizontal and vertical deflection signals for causing an electron beam generated by each of said cathode ray tubes to scan its associated viewing screen; and means for generating and coupling a control signal for independently modulating said electron beam of each of said cathode ray tubes for producing a low-valued plurality of said picture elements on the screen of each of said cathode ray tubes, the picture elements produced by said plurality of cathode ray tubes combining to form said selected billboard display picture on said billboard system display screen with the picture elements associated with each of said cathode ray tubes representing an unrecognizably small portion of said billboard display picture.

3. A billboard video display system according to claim 2 wherein the viewing screen of each of said cathode ray tubes is coated with a coarse phosphor pattern comprising a plurality of trios of relatively wide red, green and blue phosphor stripes, said color phosphor stripes being separated from each other by a plurality of relatively wide black stripes, a predetermined portion of each of said trios defining one of said picture elements.

4. A billboard video display system according to claim 2 wherein the viewing screen of each of said cathode ray tubes is coated with a coarse phosphor pattern comprising a first phosphor trio deposited over approximately one-half of said viewing screen and a second phosphor trio deposited over the other half of said viewing screen, each of said phosphor trios comprising three relatively wide vertical color phosphor stripes separated from each other by a plurality of relatively wide black stripes.

5. A billboard video display system according to claim 4 wherein the viewing screen of each of said cathode ray tubes includes a relatively wide horizontal black stripe dividing each of said trios into substantially identical upper and lower portions.

6. A billboard video display system according to claim 4 wherein said control signal is adapted for modulating said electron beam of each of said cathode ray tubes such that each of said phosphor trios provides an independently controllable upper and lower color picture element.

7. A billboard video display system according to claim 2 wherein each of said cathode ray tubes includes a horizontal and a vertical deflection yoke, the horizontal and vertical deflection yokes associated with a series of said cathode ray tubes being operated in common in response to said deflection means.

8. A billboard video display system for producing a selected billboard display picture consisting of a plurality of color picture elements, said system comprising:

a plurality of cathode ray tubes arranged in a predetermined configuration, the viewing screens of said cathode ray tubes compositely forming a billboard system display screen, the viewing screen of each of said cathode ray tubes being coated with a coarse phosphor pattern comprising a plurality of trios of relatively wide red, green and blue color phosphor stripes, said color phosphor stripes being separated from each other by a plurality of relatively wide black stripes;

deflection means for causing an electron beam generated by each of said cathode ray tubes to scan its associated viewing screen; and means for generating and coupling a control signal for modulating said electron beam of each of said cathode ray tubes such that each of said trios represents at least one individually controllable color picture element, the color picture elements produced on the screens of said plurality of cathode ray tubes combining to form said selected billboard display picture on said billboard system display screen with the color picture elements associated with each of said cathode ray tubes representing an unrecognizably small portion of said billboard display picture.

9. A billboard video display system according to claim 8 wherein said deflection means comprises free-running means for causing the electron beam generated by each of said cathode ray tubes to scan its associated viewing screen.

10. A billboard video display system according to claim 8 wherein the viewing screen of each of said cathode ray tubes includes a relatively wide horizontal black stripe dividing each of said trios into substantially identical upper and lower portions.

11. A billboard video display system for producing a selected billboard display picture consisting of a plurality of color picture elements, said system comprising:

a plurality of cathode ray tubes arranged in a predetermined configuration, the viewing screens of said cathode ray tubes compositely forming a billboard system display screen, the viewing screen of each of said cathode ray tubes being coated with a coarse phosphor pattern comprising a first phosphor trio deposited over approximately one-half of said viewing screen and a second phosphor trio deposited over the other half of said viewing screen, each of said phosphor trios comprising three relatively wide vertical red, green and blue phosphor stripes separated from each other by a plurality of relatively wide black stripes;

deflection means for causing an electron beam generated by each of said cathode ray tubes to scan its associated viewing screen; and means for generating and coupling a control signal for modulating said electron beam of each of said cathode ray tubes such that each of said phosphor trios provides an independently controllable upper and lower color picture element, the color picture elements provided by said plurality of cathode ray tubes combining to form said selected billboard display picture on said billboard system display screen.

12. A billboard video display system according to claim 11 wherein said deflection means comprises free-running means for causing the electron beam generated by each of said cathode ray tubes to scan its associated viewing screen.

13. A billboard video display system according to claim 11 wherein the viewing screen of each of said cathode ray tubes includes a relatively wide horizontal black stripe dividing each of said trios into substantially identical upper and lower portions.

* * * * *